(12) United States Patent
Mehrseresht

(10) Patent No.: US 10,152,637 B2
(45) Date of Patent: Dec. 11, 2018

(54) TEMPORAL SEGMENTATION OF ACTIONS USING CONTEXT FEATURES

(71) Applicant: CANON KABUSHIKI KAISHA, Tokyo (JP)

(72) Inventor: Nagita Mehrseresht, West Pennant Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 15/265,653

(22) Filed: Sep. 14, 2016

(65) Prior Publication Data

US 2018/0075306 A1    Mar. 15, 2018

(51) Int. Cl.
*G06K 9/00*   (2006.01)
*G06K 9/62*   (2006.01)

(52) U.S. Cl.
CPC ....... *G06K 9/00765* (2013.01); *G06K 9/6267* (2013.01)

(58) Field of Classification Search
CPC .......................... G06K 9/00765; G06K 9/6267
See application file for complete search history.

(56) References Cited

U.S. PATENT DOCUMENTS

2008/0310734 A1* 12/2008 Ahammad ........ G06F 17/30781
                                                            382/209
2013/0114902 A1*  5/2013 Sukthankar ...... H04N 21/23418
                                                            382/190
2016/0321257 A1* 11/2016 Chen ................. G06F 17/30784

OTHER PUBLICATIONS

Minh Hoai, et al., Joint Segmentation and Classification of Human Actions in Video. CVPR 2011, pp. 3265-3272.
Shu, Zhixin, et al., "Action detection with improved dense trajectories and sliding window." In Workshop at the European Conference on Computer Vision, pp. 541-551. Springer International Publishing, 2014.
Brendel, William, et al., "Probabilistic event logic for interval-based event recognition." In Computer Vision and Pattern Recognition (CVPR), 2011 IEEE Conference on, pp. 3329-3336. IEEE, 2011.
Koby Crammer, et al., "On the Algorithmic Implementation of Multiclass Kernel-based Vector Machines," Journal of Machine Learning Research 2 (2001) pp. 265-292, School of Computer Science & Engineering Hebrew University, Jerusalem 91904, Israel 2001.

* cited by examiner

*Primary Examiner* — John B Strege
(74) *Attorney, Agent, or Firm* — Canon USA, Inc. I.P. Division

(57) ABSTRACT

A method of segmenting a video sequence. A segment score is determined for each of a plurality of fixed length segments of the video sequence. Each of the segment scores provide a score for a plurality of actions associated with a corresponding fixed length segment. A current segment is selected from the segments of the video sequence. The segment score is selected for a further one of the segments, the further segment being disjoint with the current segment and being used to provide information about actions that were classified outside the current segment. A further segment score is determined for the current segment according to the selected segment score. The video is segmented based on the determined further segment score.

15 Claims, 11 Drawing Sheets

TEMPORAL SEGMENTATION OF ACTIONS USING CONTEXT FEATURES

TECHNICAL FIELD

The present invention relates to temporal segmentation of actions in a video sequence using context features. In particular, the present invention relates to a method, apparatus and system for performing temporal segmentation of actions. The present invention also relates to a computer program product including a computer readable medium having recorded thereon a computer program for performing temporal segmentation of actions in a video sequence using context features.

BACKGROUND

A temporal segment of a video is a continuous set of frames from frame $f_1$ to frame $f_2$, where frame $f_1$ is temporally before frame $f_2$; i.e., $f_1 \leq f_2$. Other terms such as temporal interval or time interval may also be used to refer to a temporal segment. The length of a temporal segment refers to the number of frames in that segment. Two temporal segments are called non-overlapping when there is no frame which belongs to both segments. Two non-overlapping temporal segments may also be called disjoint segments.

Fixed length segmentation is the act of segmenting the video sequence into temporal segments of a fixed non-zero length (e.g., 60 frames). Fixed length segmentation may be done with non-zero temporal overlap, in which case some frames could be part of two different segments. For example, when segmenting a video sequence into fixed length segments of 60 frames length with 50% temporal overlap, the first temporal segment includes frames 1 to 60, the second temporal segment would include frames 31 to 90, and so on.

The term action as used below refers to the act of doing something, such as 'walking', 'kicking', 'cutting', often in order to make something happen. The term action segment as used below refers to the temporal segment that contains an instance of an action of interest.

Temporal segmentation of an action, which may also be referred to as action localization, is the task of determining the temporal segment (i.e., action segment) that contains the action of interest. Thus, temporal segmentation of an action includes the two sub-tasks of finding the start and the end frames of the temporal segment and finding the action classification label associated with that segment.

A prior-art method for temporal segmentation of an action, called sliding window search, trains a classifier for the action of interest, using a given training set containing segmented instances of the action of interest. The trained classifier is then applied to a set of fixed length and often overlapping temporal segments of a new (unseen) video. The length of the segments (e.g., 100 frames), and the ratio of overlap (e.g., 25%), are predetermined. The segments containing the action of interest (if any) are then identified using non-max suppression which greedily selects the segments with the highest scores. Non-max suppression is a local maxima search with a predetermined threshold. A disadvantage of using a sliding window search is that the precision of localization depends on the resolution of the search and therefore the number of evaluated temporal segments. Also, as the final segmentation is done locally and using a greedy algorithm, the generated temporal segments are not jointly optimized.

Parsing videos of actions is the task of decomposing a video sequence into action segments, and is a very challenging task, since the number of constituent actions is not known a priori. Different instances of a same action may have very different durations; and different actions of interest may also have very different durations. For example, while repetitive actions like walking and running may last for a few seconds to many seconds, snap actions like kicking and falling may last only for a fraction of a second to a few seconds. Besides, human action recognition from videos is generally hard due to variation in size, scale, view-point, object deformation and occlusion. Also, without knowing the temporal segmentation, a part of one action (e.g., a stride in a walking action) may look similar to a different action (e.g., a kicking action).

SUMMARY

It is an object of the present invention to substantially overcome, or at least ameliorate, one or more disadvantages of existing arrangements.

Context information, such as temporal information about long term activity that an action is part, is beneficial for action localization. Such context information may also include other actions which are also part of the long term activity. Conventional action segmentation methods do not use context information. Disclosed is an action parsing method which utilises context features to improve the accuracy of segmentation and classification.

According to one aspect of the present disclosure, there is provided a method of segmenting a video sequence, the method comprising:

determining a segment score for each of a plurality of fixed length segments of the video sequence, each of the segment scores providing a score for a plurality of actions associated with a corresponding fixed length segment;

selecting a current segment from said segments of the video sequence;

selecting the segment score for a further one of said segments, the further segment being disjoint with the current segment and being used to provide information about actions that were classified outside the current segment;

determining a further segment score for the current segment according to the selected segment score; and segmenting the video based on the determined further segment score.

According to another aspect of the present disclosure, there is provided an apparatus for segmenting a video sequence, the apparatus comprising:

means for determining a segment score for each of a plurality of fixed length segments of the video sequence, each of the segment scores providing a score for a plurality of actions associated with a corresponding fixed length segment;

means for selecting a current segment from said segments of the video sequence;

means for selecting the segment score for a further one of said segments, the further segment being disjoint with the current segment and being used to provide information about actions that were classified outside the current segment;

means for determining a further segment score for the current segment according to the selected segment score; and means for segmenting the video based on the determined further segment score.

According to still another aspect of the present disclosure, there is provided a system for segmenting a video sequence, the comprising:

a memory comprising data and a computer program;

a processor coupled to the memory for executing the computer program, the computer program comprising instructions for:

determining a segment score for each of a plurality of fixed length segments of the video sequence, each of the segment scores providing a score for a plurality of actions associated with a corresponding fixed length segment;

selecting a current segment from said segments of the video sequence;

selecting the segment score for a further one of said segments, the further segment being disjoint with the current segment and being used to provide information about actions that were classified outside the current segment;

determining a further segment score for the current segment according to the selected segment score; and segmenting the video based on the determined further segment score.

According to still another aspect of the present disclosure, there is provided a non-transitory computer readable storage medium having a computer program stored on the storage medium for segmenting a video sequence, the program comprising:

code for determining a segment score for each of a plurality of fixed length segments of the video sequence, each of the segment scores providing a score for a plurality of actions associated with a corresponding fixed length segment;

code for selecting a current segment from said segments of the video sequence;

code for selecting the segment score for a further one of said segments, the further segment being disjoint with the current segment and being used to provide information about actions that were classified outside the current segment;

code for determining a further segment score for the current segment according to the selected segment score; and code for segmenting the video based on the determined further segment score.

BRIEF DESCRIPTION OF THE DRAWINGS

One or more embodiments of the invention will now be described with reference to the following drawings, in which.

DETAILED DESCRIPTION INCLUDING BEST MODE

Figure 1:
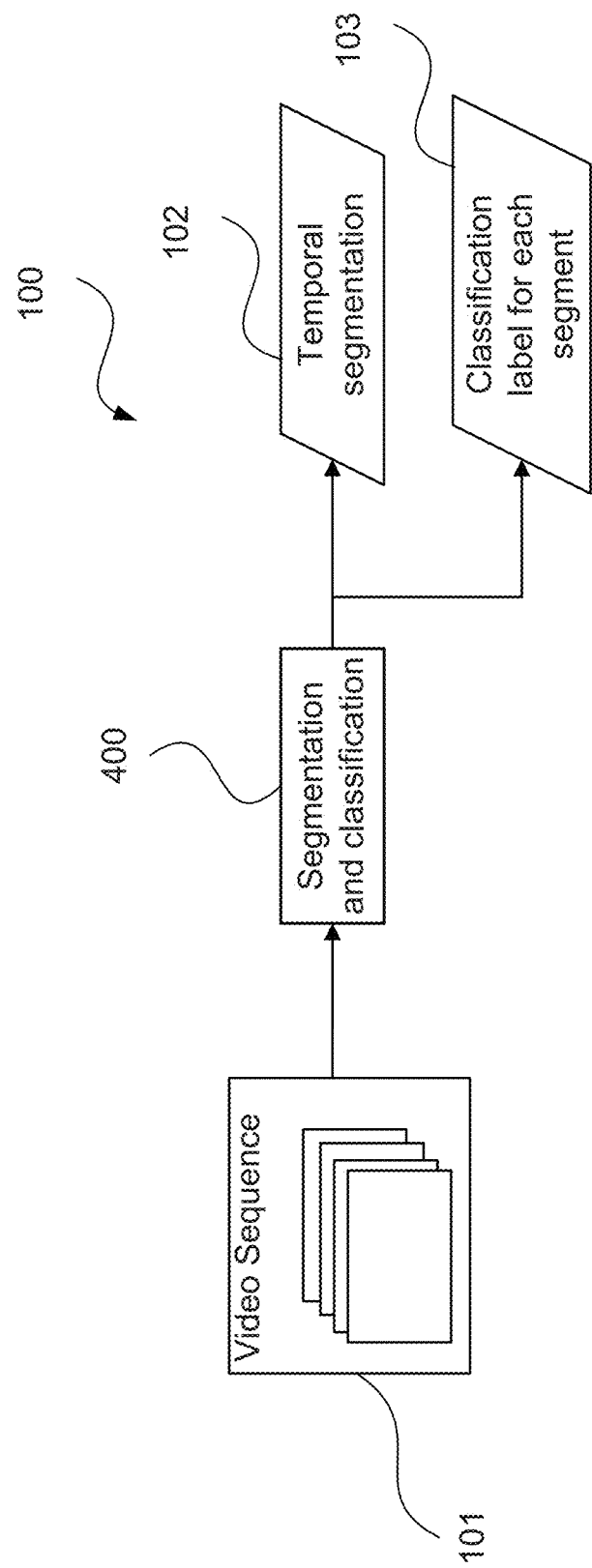
FIG. 1 is a schematic block diagram of a data processing architecture.

Where reference is made in any one or more of the accompanying drawings to steps and/or features, which have the same reference numerals, those steps and/or features have for the purposes of this description the same function(s) or operation(s), unless the contrary intention appears.

Action classification accuracy may be improved if in addition to visual information of each segment of a video sequence, classification information of other segments of the video sequence is also used as context features. Using context features for action localization, however, is more difficult than using context features for classification, as using context features for action localization requires access to classification information of other action segments which are also not yet known at the time of determining all action segments jointly.

Figure 8:
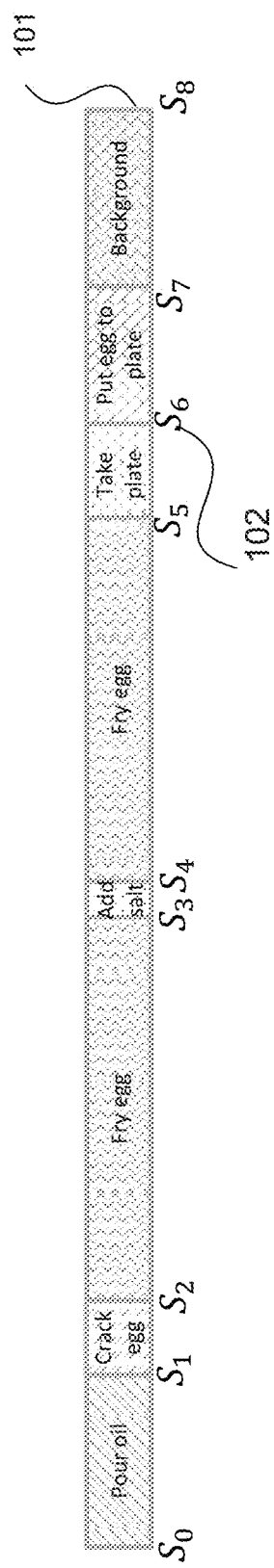
FIG. 8 shows parsing of an example video sequence to action segments.

FIG. 8 shows parsing of an example video sequence to action segments. As shown in FIG. 8, for a given temporal sequence $X_{0:n}$ of length n+1 frames, temporal parsing may be used to determine a set of breakpoints $S_0, S_1, \ldots, S_K$ 801 which segments the sequence into action segments, where each action segment contains all frames of (an instance of) an action of interest. K represents the number of action segments in the sequence $X_{0:n}$ and is not known in advance. The value of K is determined as part of an optimization problem which is determined for each given sequence.

The set of breakpoints $S_{0l}, S_1, \ldots, S_K$ 801 provides a temporal parsing of the temporal sequence $X_{0:n}$. In particular, a segmentation method described below is configured to satisfy the following additional constraints:

"No-gap" requirement; i.e., unions of all action segments equal the original sequence, in accordance with Equation (1), below:

$$\cup_{i=0 \ldots K} X_{S_i:S_{i+1}} = X_{0:N} \qquad (1)$$

The action segments do not overlap, in accordance with Equation (2), below:

$$\forall i,j, i \neq j \; X_{S_i:S_{i+1}} \cap X_{S_j:S_{j+1}} = \emptyset \qquad (2)$$

Each segment refers to a set of consecutive frames.

The parsing of the temporal sequence may also need to satisfy constraints on the length of the segments, in accordance with Equation (3), below:

$$l_{min} \leq \text{len}(X_{S_i:S_{i+1}}) \leq l_{max}. \qquad (3)$$

where $l_{min}$ and $l_{max}$ respectively correspond to the minimum and the maximum segment lengths that would be considered during the parsing being performed.

To satisfy the no-gap requirement, a special 'background' class may be added to the list of actions of interest to cover the intervals where no action of interest happens. In particular, the class 'background' includes both idle and any other action which is not of interest. For the purpose of temporal parsing, 'background' class is just like another action class of interest, and will not be mentioned as a special class in the rest of this work.

The present disclosure relates to joint segmentation and classification of videos of actions. The methods described below are used to parse a recorded video sequence (also known as video or sequence for the purpose of this disclosure) to action segments. Sections of a live video feed may also be analysed with a delay of a few seconds. The described arrangements may also be used to generate a sequence of action classification labels associated with the temporal segmentation.

Figure 4:
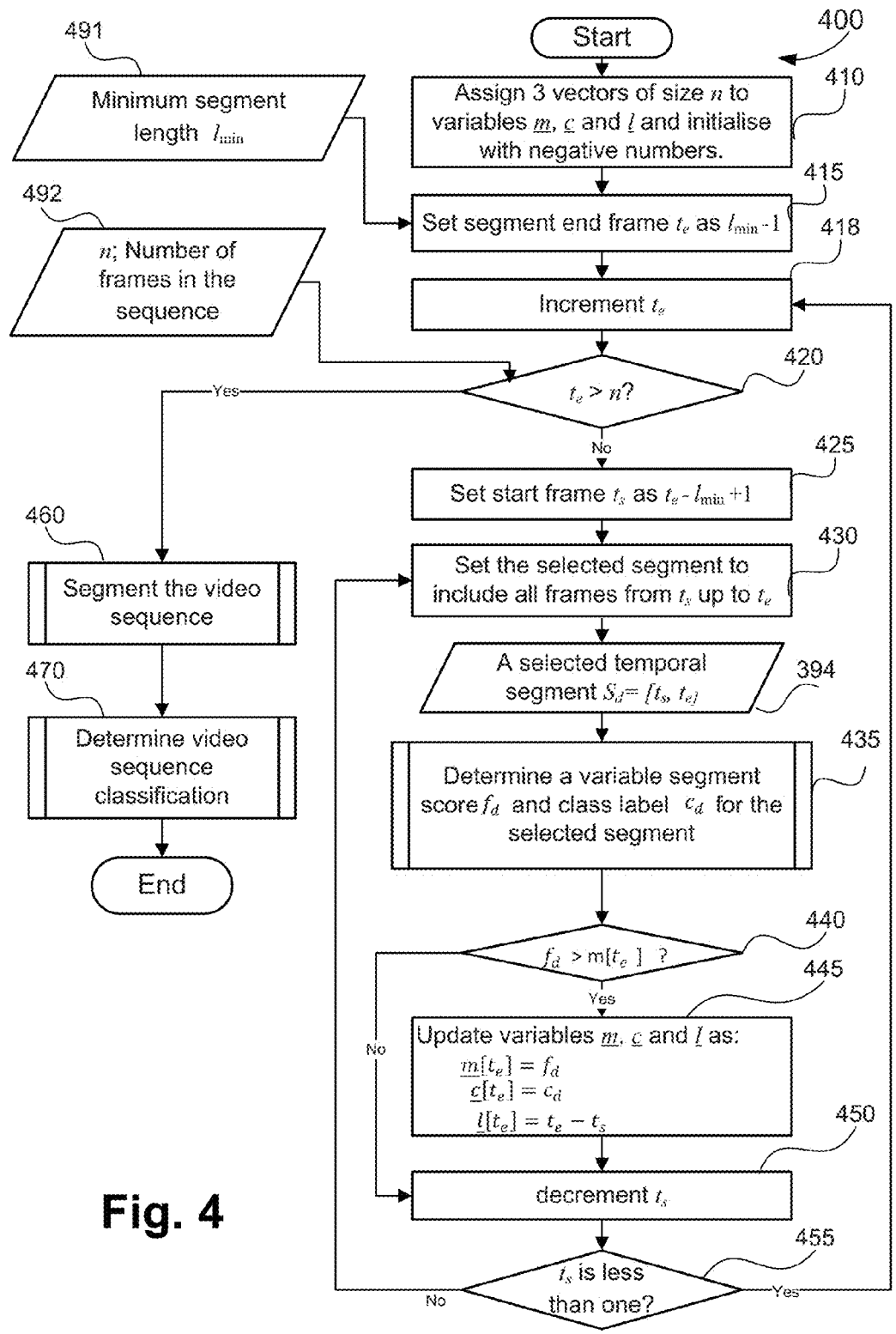
FIG. 4 is a schematic flow diagram showing a method of selecting a plurality of variable length segments and determining a temporal segmentation of actions.

FIG. 1 is a schematic block diagram of a data processing architecture 100 according to one arrangement. FIG. 4 is a schematic flow diagram showing a method 400 of selecting a plurality of variable length segments of a video sequence. The method 400 uses a parsing process to generate temporal segmentation 102 and corresponding classification labels 103 for the video sequence 101.

Figure 2A:
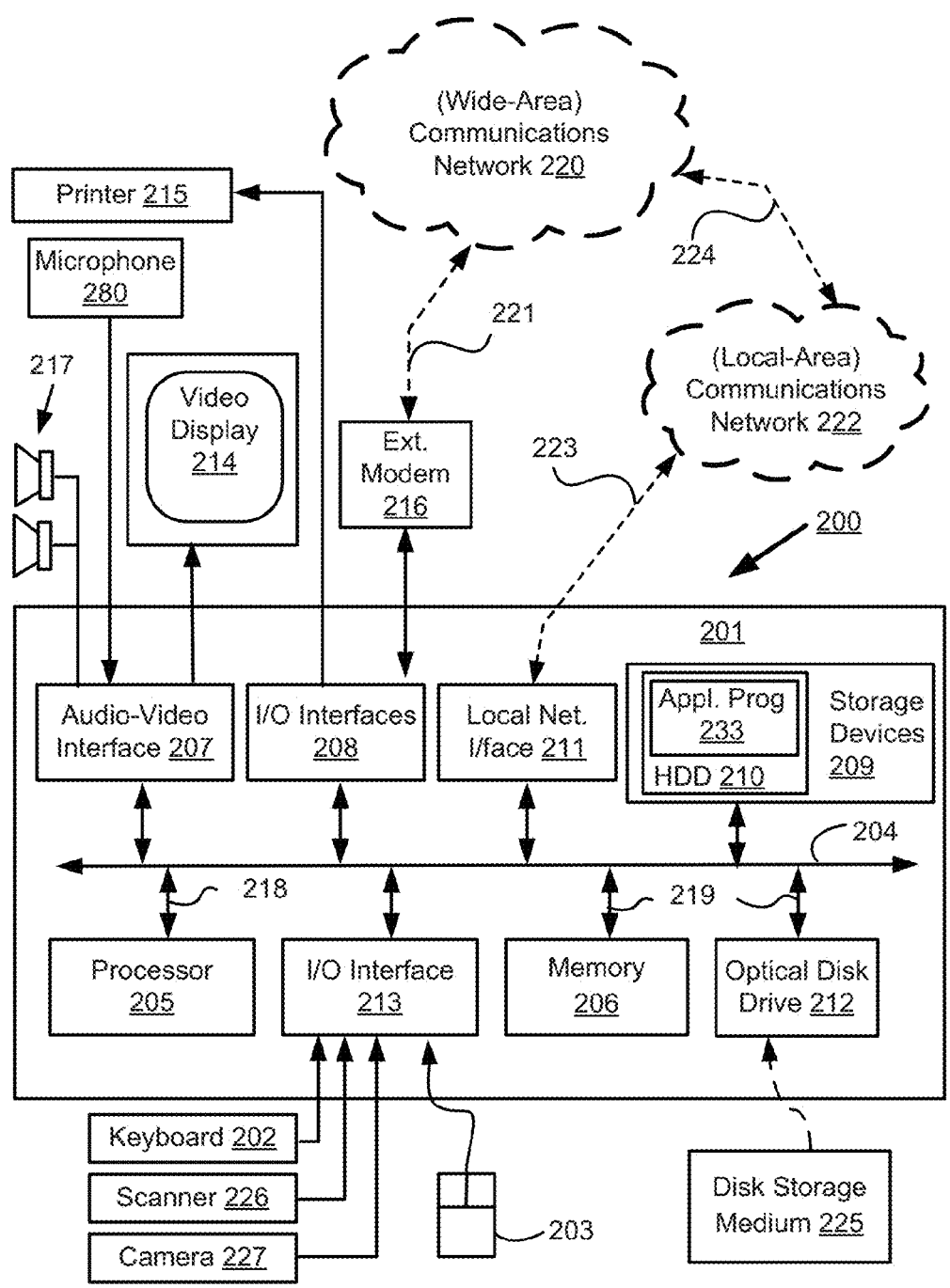
FIGS. 2A and 2B form a schematic block diagram of a general purpose computer system upon which arrangements described may be practiced.
Figure 2B:
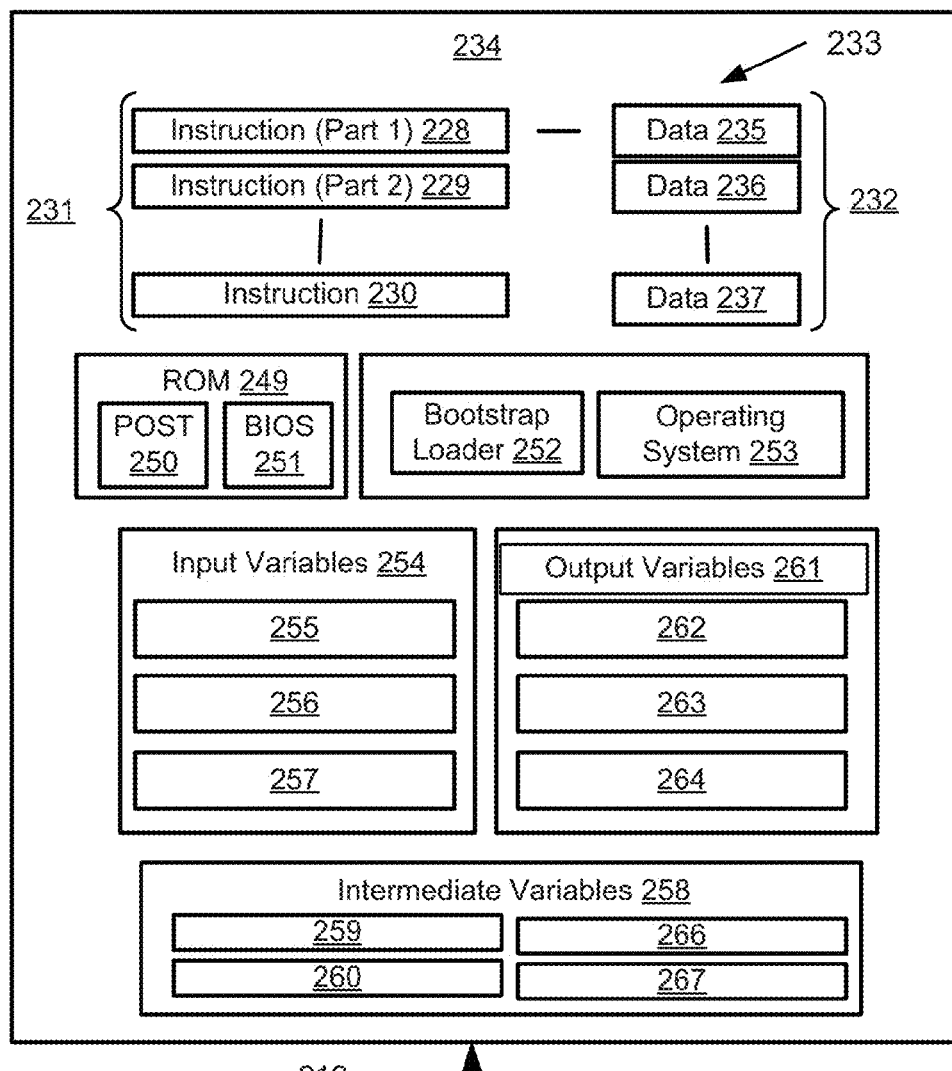
Figure 2B:
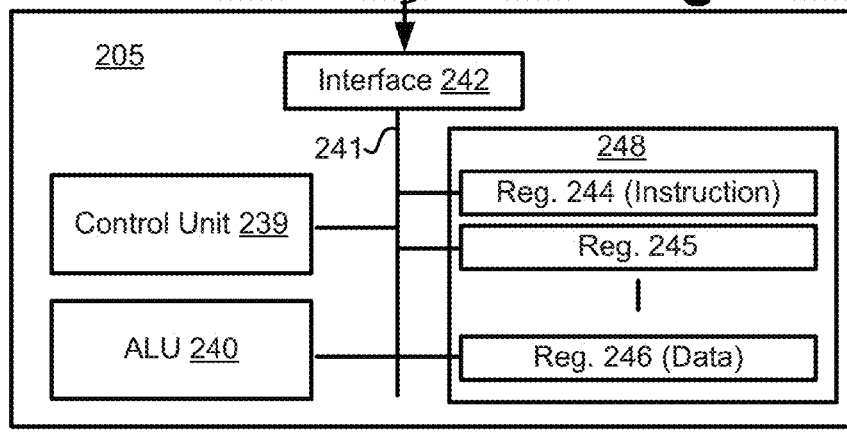

FIGS. 2A and 2B depict a general-purpose computer system 200, upon which the various arrangements described can be practiced.

As seen in FIG. 2A, the computer system 200 includes: a computer module 201; input devices such as a keyboard 202, a mouse pointer device 203, a scanner 226, a camera 227, and a microphone 280; and output devices including a printer 215, a display device 214 and loudspeakers 217. An external Modulator-Demodulator (Modem) transceiver device 216 may be used by the computer module 201 for communicating to and from a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practiced include IBM-PC's and compatibles, Sun Sparcstations, Apple Mac™ or like computer systems.

The method 400 and other methods described below may be implemented using the computer system 200 wherein the processes of FIGS. 3 to 10, to be described, may be implemented as one or more software application programs 233 executable within the computer system 200. In particular, the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 233 is typically stored in the HDD 210 or the memory 206. The software is loaded into the computer system 200 from the computer readable medium, and then executed by the computer system 200. Thus, for example, the software 233 may be stored on an optically readable disk storage medium (e.g., CD-ROM) 225 that is read by the optical disk drive 212. A computer readable medium having such software or computer program recorded on the computer readable medium is a computer program product. The use of the computer program product in the computer system 200 preferably effects an advantageous apparatus for implementing the described methods.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed arrangements use input variables 254, which are stored in the memory 234 in corresponding memory locations 255, 256, 257. The arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 3 to 10 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The described methods may alternatively be implemented in dedicated hardware such as one or more integrated circuits performing the functions or sub functions of the methods. Such dedicated hardware may include graphic processors, digital signal processors, or one or more microprocessors and associated memories.

Given a pre-trained classification model, a scoring function, $\mathcal{F}_{score}$ can be formed which given a segment $X_{S_i:S_{i+1}}$ returns a classification label $c_i$ of the class of the action in the segment, and a confidence score $d_i$ ($d_i \geq 0$) of classifying the segment to the class $c_i$, in accordance with Equation (4) below, $$\mathcal{F}_{score}: X_{S_i:S_{i+1}} \to (d_i, c_i) \quad (4)$$

At recall time the set of breakpoints $S_0, S_1, \ldots, S_K$ are found by maximizing the overall confidence score, $\Sigma_{i=0}^K d_i$, in accordance with Equation (5), below:

$$\max_{K, S_0, \ldots, S_K} \Sigma_{i=0}^K d_i \quad (5)$$

The maximization problem of Equation (5) can be solved using dynamic programming. The dynamic programming solves the optimization problem of Equation (5) by determining the solution for shorter sub-sequences. For a given sub-sequence $X_{0:u}$ ending at point u, u=1, ..., n, γ(u) may be used to represent the parsing score for the sub-sequence $X_{0:u}$.

For every tuple (u, l), u∈{1, ..., n} and l∈{$l_{min}, \ldots, l_{max}$}, $$\xi(u,l) = d_{u-l:u}$$

represents the confidence score of classifying the candidate segment $X_{u-l:l}$ to one of the actions of interest. The parsing score γ(u) can be efficiently determined using dynamic programming by determining the segment length l when solving the optimization problem of in accordance with Equation (6), below $$\gamma(u) = \max_{l_{min} \leq l \leq l_{max}} \xi(u,l) + \gamma(u-l) \quad (6)$$

To solve the optimization problem of Equation (6), a forward pass algorithm of Equation (7), below, may be used. Equation (7) determines the maximum parsing scores for each sub-sequence $X_{0:u}$ ending at frame u, u ∈ {1, ..., n}, by searching over all possible segments of length l in the range $l_{min}$ to $l_{max}$. The segment length l* which resulted in the maximum parsing score is stored in ρ(u), and the classification label of the segment is stored in β(u).

```
Initialization: γ ← [-∞]_n, β ← [0]_n, ρ ← [0]_n        (7)
Repeat:
    For u = 1: n
        For l = l_min : l_max
            If ξ(u, l) + γ(u - l) > γ(u) do
                γ(u) ← ξ(u, l) + γ(u - l)
                β(u) ← c_{u-l:u}
                ρ(u) ← l
```

In Equation (7), $[0]_n$ and $[-\infty]_n$ represents vectors of length n initialized to zero and −∞ respectively. An arrangement with an implementation of the forward pass algorithm of Equation (7) may use any negative number instead of −∞.

Using the forward pass algorithm of Equation (7), γ contains the parsing score for each sub-sequence $X_{0:u}$ ending at point u, u ∈{1, ..., n}; β and ρ contain information about the class labels and segments' length respectively.

Once the values of γ, β and ρ are determined for all end-points u, the parsing and the set of class labels may be determined by using a backward pass algorithm of Equation (8), as below.

```
Initialization: i ← n, j ← 1        (8)
Repeat:
    While i ≥ 0 do
        C(j) ← β(i)
        S(j) ← i
        i ← i - ρ(i)
        j ← j + 1
    Do
    Reverse the order of elements in C and S.
```

Figure 5:
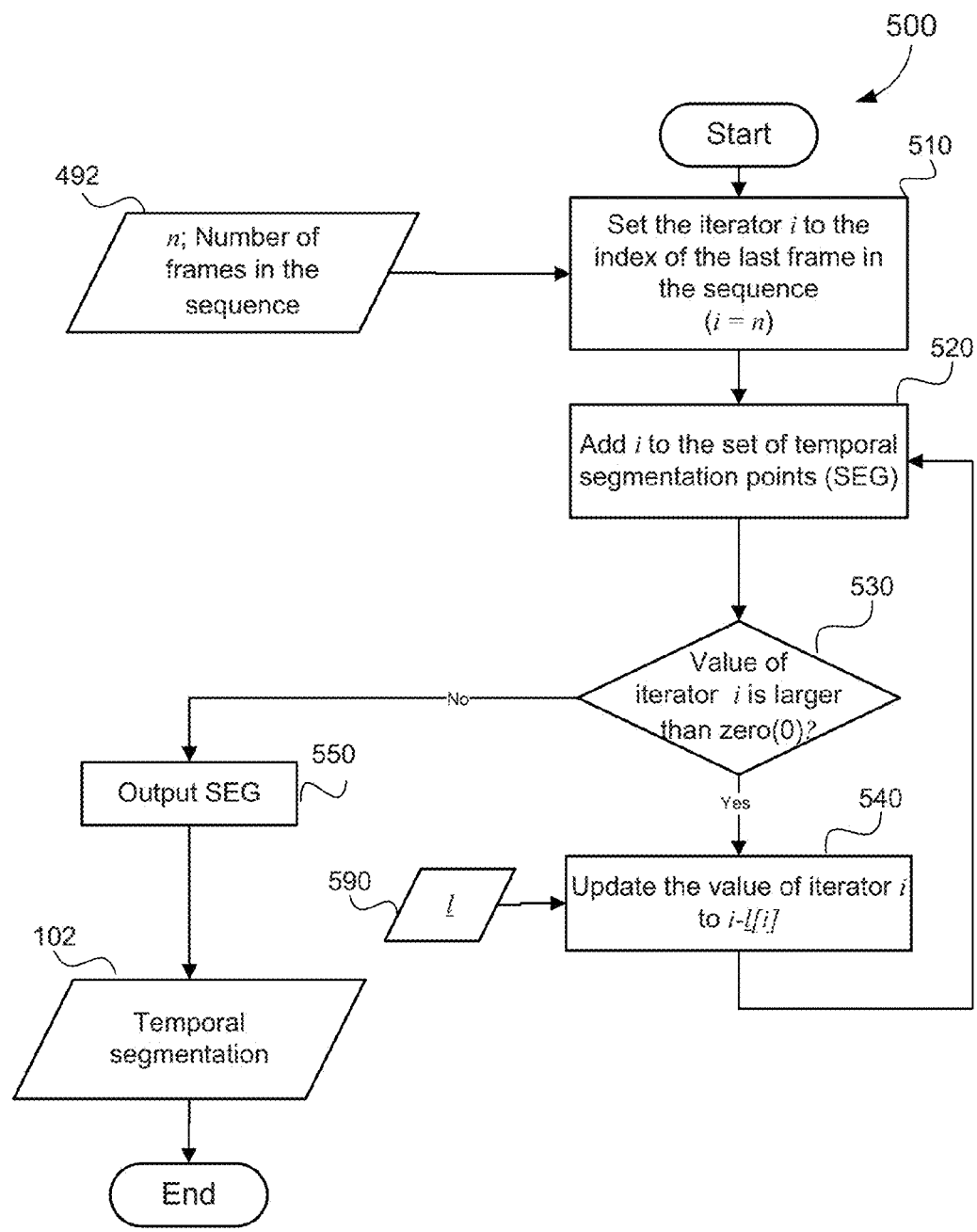
FIG. 5 is a schematic flow diagram showing a method of determining a temporal segmentation of actions as used in the method of FIG. 4.
Figure 6:
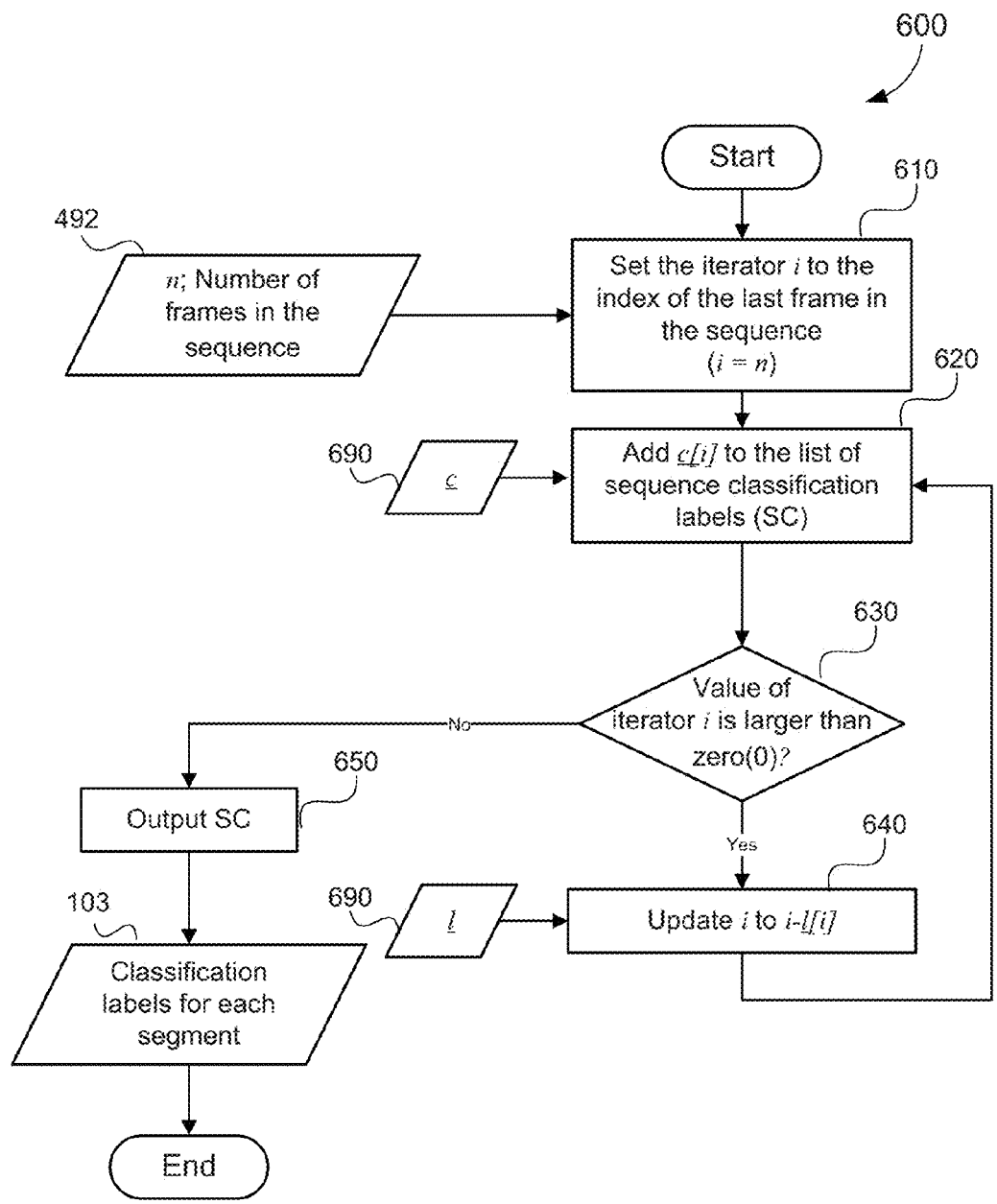
FIG. 6 is a schematic flow diagram showing a method of classifying temporal segments as used in the method of FIG. 4.

Using the backward pass algorithm of Equation (8), K=len(S)+1; S is the set of segment breakpoints $S_0, \ldots, S_K$ and C contains the corresponding classification labels of each estimated action segment. The schematic flow diagrams of FIGS. 5 and 6 show the process of determining the temporal segmentation and classification of the backward pass algorithm of Equation (8).

Accuracy of the temporal segmentation and the corresponding sequence of classification labels generated by applying the parsing algorithms of Equations (7) and (8) depends on the accuracy of the scoring function $\mathcal{F}_{score}$ of Equation. (4).

One problem with determining the segmentation of a video sequence using a classifier which evaluates each segment individually is that when the classification task is hard, the classification confidence generally is low and too noisy to accurately guide the temporal segmentation. Temporal context information, such as knowledge of what other actions have happened before or after a segment of interest may improve the recognition accuracy. However, determining what other actions have happened, requires knowing the temporal segmentation before and after the segment of interest. The temporal segmentation information is not available when the parsing algorithm is jointly searching for the overall segmentation of the input sequence.

Multi-scale fixed size segmentation and max pooling may be used to generate temporal context features for an improved action classifier which can efficiently be used in the multi-segment scoring function $\mathcal{F}_{score}$. The improved action classification method uses two discriminative classifiers in the form of a first layer classifier and a second layer classifier as described below.

The first layer classifier, used for generating context features, is a multi-class support vector machine (SVM) trained using a collection of training segments $X^1, \ldots, X^n$ each containing an action of interest, or being an instance of the background class, and the corresponding class labels. The first layer classifier is applied to each segment independently and uses an encoding of the local features in segments $X^i$ denoted as $\varphi(X^i)$. The parameters ω of the first layer classifier are learned by optimizing in accordance with Equation (9), below:

$$\text{minimize}_{\tilde{\omega}_j, \vartheta^i \geq 0} \frac{1}{2m} \sum_{j=1}^m \|\tilde{\omega}_j\|^2 + \frac{1}{\lambda} \sum_{i=1}^n \vartheta^i \text{ s.t.} \quad (9)$$

$$(\tilde{\omega}_{y^i} - \tilde{\omega}_y)^T \varphi(X^i) \geq 1 - \vartheta^i, \forall\, i, y \neq y^i$$

where $y^i$ is the ground truth class label associated with the segment $X^i$. An example of $\varphi(X^i)$ is a Fisher vector encoding of STIP or iDT features calculated from $X^i$. Here, $\tilde{\omega}_y^T \varphi(X^i)$ is the SVM score for assigning $X^i$ to class y.

Figure 9:
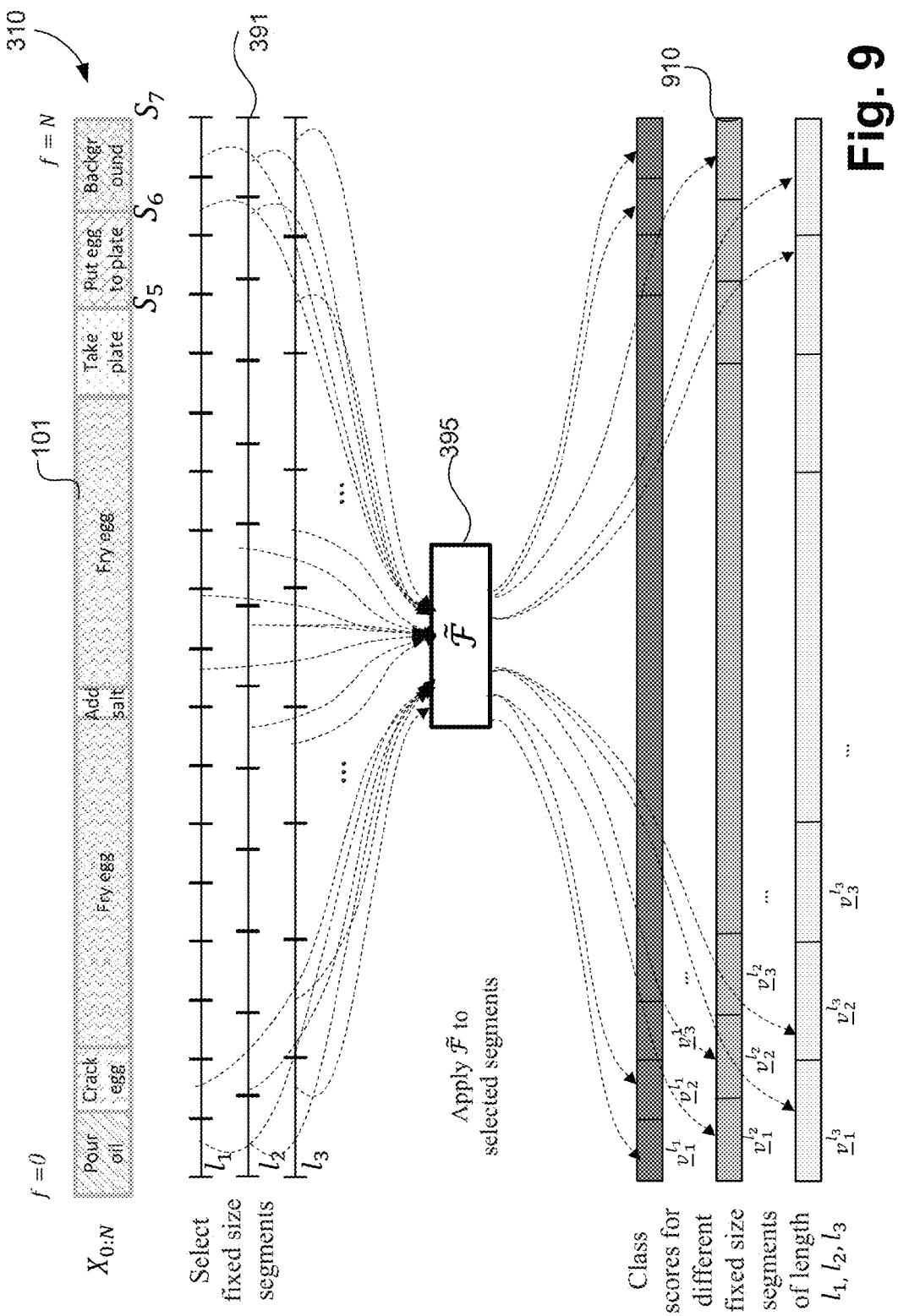
FIG. 9 shows generation of temporal context features by determining initial classification scores for predetermined segments of an example video sequence.

The SVM trained as above is used as temporal context scoring function $\tilde{\mathcal{F}}$. As shown in FIG. 9, given a segment $\tilde{X}$ of length $l_i$, the temporal context scoring function $\tilde{\mathcal{F}}$ returns a vector $v^{l_i}$; the $j^{th}$ element of $v^{l_i}$ is the SVM score for classifying $\tilde{X}$ as the $j^{th}$ class, in accordance with Equation (10), below.

$$\tilde{\mathcal{F}}: \tilde{X}_{t:t+l_i} \to v^{l_i}$$

$$v^{l_i}[j] = \omega_j^T \cdot \varphi(X_{t:t+l_i}) \quad (10)$$

Alternatively, an action classifier using convolutional neural networks (CNN) and a softmax layer can be used as the temporal context scoring function $\tilde{\mathcal{F}}$. In that case, the temporal context vector $v^{l_i}$ is the softmax score for different action classes.

As shown in FIG. 9, to generate temporal context features for a given sequence, multi-scale fixed size segmentation is firstly used and the context scoring function $\tilde{\mathcal{F}}$ is applied to all segments of length $l_i$; $l_i \in \{l_1, l_2, \ldots, l_w\}$, where w is a predefined number of scales. The vectors $\underline{v}_j^{l_i}$ determined for all segments j of length $$l_i, j \in \left\{1, \ldots, \left\lceil \frac{n+1}{l_i} \right\rceil\right\},$$

are cached for further processing which generates context features by max-pooling subsets of $\underline{v}_j^{l_i}$ values.

Figure 10:
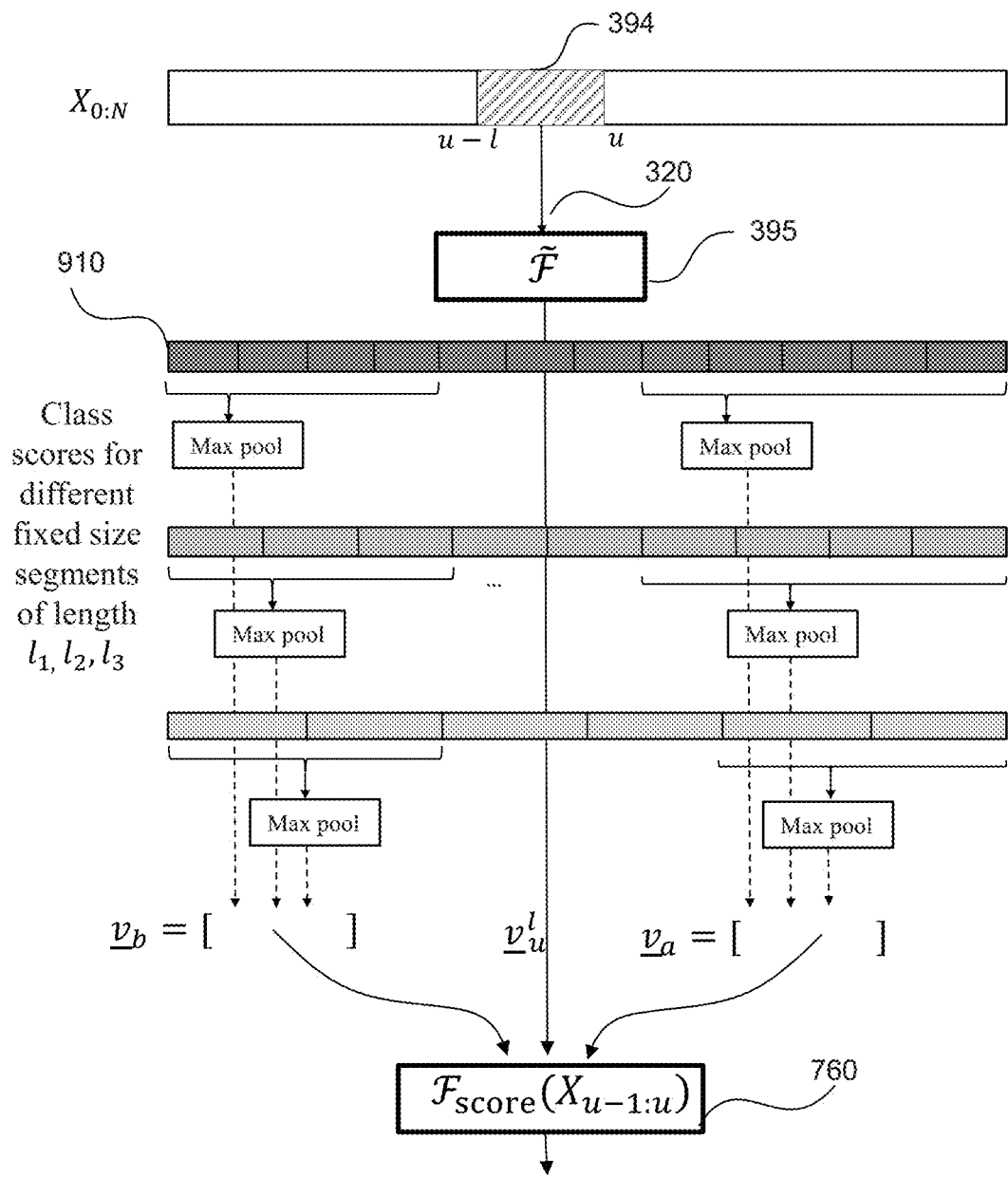
FIG. 10 shows the use of temporal context features in a scoring function, for an example video sequence.

FIG. 10 shows a proposed multi-segment scoring function $\mathcal{F}_{score}$ which may be used to determine the confidence score $\xi(u,l)$ as described above. As shown in FIG. 10, for any candidate segment $X_{u-l:u}$ in the forward pass of Equation (8), $\tilde{\mathcal{F}}(X_{u-l:u}) = \underline{v}_u^l$ is determined. Separately at each segmentation scale $l_i$, per-class max-pooling is applied to $\underline{v}_j^{l_i}$ scores of all segments before the segment $$X_{u-l:u}\left(j \leq \left\lfloor \frac{u-l}{l_i} \right\rfloor\right),$$

and after the segment $$X_{u-l:u}\left(j \geq \left\lceil \frac{u}{l_i} \right\rceil\right).$$

The concatenation of the max-pooled scores of all scales $l \in \{l_1, l_2, \ldots, l_w\}$ occurring before the segment $X_{u-l:u}$ is denoted as $\underline{v}_b$. Similarly, the concatenation of the max-pooled scores of all scales $l \in \{l_1, l_2, \ldots, l_w\}$ occurring after the segment $X_{u-l:u}$ is called $\underline{v}_a$.

$\mathcal{F}_{score}$ determines the classification label $c_{u-l:u}$ and the classification confidence score $\xi(u,l)$ of the segment $X_{u-l:u}$ by applying the second layer classifier which uses the concatenation of $\underline{v}_b$, $\underline{v}_u^l$ and $\underline{v}_a$ denoted in accordance with Equation (11), as follows:

$$\psi(X_{u-l:u}) = [\underline{v}_b, \underline{v}_u^l, \underline{v}_a] \quad (11)$$

as the input feature vector. The second layer classifier is also a multi-class SVM and is also trained using the collection of training segments $X^1, \ldots, X^n$ and the corresponding classification labels, but using the concatenated scores $\psi(X_{u-l:u})$. The parameters $\omega_j$ of the second layer classifier are determined by optimizing in accordance with Equation (12), below $$\text{minimize}_{\omega_j, \vartheta^i \geq 0} \frac{1}{2m} \sum_{j=1}^{m} \|\omega_j\|^2 + \frac{1}{\lambda} \sum_{i=1}^{n} \vartheta^i \quad \text{s.t.} \quad (12)$$

$$(\omega_{y^i} - \omega_y)^T \psi(X^i) \geq 1 - \vartheta^i, \forall i, y \neq y^i$$

The method 400 may be implemented as one or more software code modules of the application program 233 resident in the hard disk drive 210 and being controlled in its execution by the processor 205. The method 400 will be described by way of example with reference to the software architecture 100 of FIG. 1. The method 400 starts with a memory initialization step 410 which given the length of the video sequence in frames, n, three (3) blocks of the memory 206 are allocated under execution of the processor 205, each block being large enough for an array of length n.

The allocated memories are assigned to three (3) variables called $\underline{m}$, $\underline{c}$ and $\underline{l}$. The variables $\underline{m}$, $\underline{c}$ and $\underline{l}$ are used by the subsequent steps in the method 400 to generate the information required for the segmentation and classification steps 460 and 470, respectively. The memory initialization step 410 initializes the variables $\underline{m}$ with negative numbers, and variables $\underline{c}$ and $\underline{l}$ with zeros. Variables $\underline{m}$, $\underline{c}$ and $\underline{l}$ corresponds to γ, β and ρ in the forward pass algorithm of Equation (7), respectively.

Step 415 to 455 form a forward search algorithm which selects a plurality of temporal segments. Each selected segment 394 is then processed a current segment by the variable-segment score generation process 300 to determine the variable-segment score and classification label associated with the selected segment using context feature.

Given the minimum segment length $l_{min}$ 491, at setting step 415, the segment end frame variable $t_e$ is set to $l_{min}-1$, where $l_{min}$ is an input (user) setting (e.g., twenty (20) frames) and $t_e$ corresponds to the variable u in the forward pass algorithm of Equation (7). While setting $l_{min}$ to a very small number (e.g. one), would not, in general, affect the generated segmentation 102, setting $l_{min}$ to an expected minimum length of actions from the targeted use-case would save the calculation of unlikely segments. The segment end frame variable $t_e$ is configured within the memory 206.

At increment step 418, the segment end frame variable $t_e$ configured within the memory 206 is incremented, under execution of the processor 205, where $t_e$ corresponds to the variable u used in the forward pass algorithm of Equation (7). The increment is done at step 418 with a step size of one frame. Setting the increment at step 418 to a number larger than one frame reduces the computation cost of searching for the segmentation, but at the cost of higher granularity (and therefore lower accuracy) of segmentation. Alternatively, a multi-frame increment step (e.g., eight (8) frames) may be used at step 418.

If the end of the segment is determined to have been reached at decision step 420, (i.e., $t_e$ is larger than n), then the method 400 follows to segmentation step 460. Otherwise, the method 400 follows to setting step 425 which sets segment start frame variable $t_s$ configured within the memory 206 to $t_e-l_{min}+1$ (i.e. $t_s=t_e-l_{min}+1$). Then at segment selecting step 430, the selected segment 394 (i.e., the current segment) is set to include all frames from $t_s$ to $t_e$, under execution of the processor 205.

Next, at determining step 435, a score $f_d$ and classification label $c_d$ are determined for the selected segment 394 under execution of the processor 205. The determined score $f_d$ and classification label $c_d$ are stored in the memory 406 under execution of the processor 205. The score $f_d$ corresponds to ξ in the forward pass algorithm of Equation (7). A method 300 of determining scores for a variable length candidate segment using context features, as executed at step 435, will be described in detail below with reference to FIG. 3.

At decision step 440, the variable-segment score $f_d$ of the current selected segment ($s_d$) is compared with the score for a previously selected segment which also ends at $t_e$ (which is stored at $t_e$th element of $\underline{m}$, i.e., $\underline{m}[t_e]$). The video sequence is segmented by comparing the segment scores of the current selected segment and the previously selected segment. If, at step 440, the variable-segment score $f_d$ of the current selected segment ($s_d$) is larger than the score for a previously selected segment which also ends at $t_e$ (i.e., $\underline{m}[t_e]$), then the method 400 continues to step 445. At step 445, the following vectors are updated as described below, under execution of the processor 205:

the vector corresponding to variable $\underline{m}$ is updated by setting the $t_e^{th}$ element of $\underline{m}$ to $f_d$ (i.e., $\underline{m}[t_e]=f_d+\underline{m}[t_s-1]$)

the vector corresponding to variable c is updated by setting the $t_e$th element of $\underline{c}$ to the classification label $c_d$ (i.e., $\underline{c}[t_e]=c_d$)

the vector corresponding to variable $\underline{l}$ is updated by setting the $t_e$th element of $\underline{l}$ to the length of the current selected segment [3]94 (i.e., $\underline{l}[t_e]=t_e-t_s$).

The updated vectors may be stored in the memory 206 under execution of the processor 205. If variable-segment score $f_d$ of the current selected segment ($s_d$) is NOT larger than the score for a previously selected segment which also ends at $t_e$ (i.e., $\underline{m}[t_e]$), then the method 400 continues to step 450.

At step 450, the segment start frame variable $t_s$ configured within memory 406 is decremented under execution of the processor 205. The decrement is performed at step 450 with a step size of one or more frames (e.g., one (1) frame). Selecting a decrement step size of larger than one frame will trade segmentation granularity (and therefore accuracy) with the number of iterations and consequently computational complexity of the search process.

After decrementing the segment start frame variable $t_s$, at decision step 455, if segment start frame variable $t_s$ is less than one, all segments with length larger than $l_{min}$ and ending at frame $t_e$ have been processed and the method 400 returns to step 418. Otherwise, the method 400 returns to step 430. At step 418, the segment end frame variable $t_e$ configured within the memory 206 is incremented under execution of the processor 205.

If segment start frame variable $t_s$ is not less than one at step 455, then the segment from $t_s$ to $t_e$ is considered to be a valid unprocessed segment.

The method 400 of FIG. 4 does not enforce any limit on the maximum length of the segment ($l_{max}$). Alternatively, a maximum action segment length limit may be enforced, in which case the method 400 would check if the segment start frame variable $t_s$ is less than one, or $t_e-t_s$ is larger than $l_{max}$ in step 455.

When all valid segments are processed and therefore the test in step 420 returns a positive result (i.e., $t_e$ is not larger than n), the method 400 follows to temporal segmenting step 460. At step 460, the temporal segmentation of the video sequence is determined under execution of the processor 205, using the variable $\underline{l}$, and stored in the memory 206. The video sequence is segmented at step 460 based on the variable-segment scores. A method 500 of determining a temporal segmentation of actions as executed at step 460 will be described in detail below with reference to FIG. 5.

Following step 460, the method 400 proceeds to classifying step 470 where the variables $\underline{c}$ and $\underline{l}$ configured within the memory 206 are used to determine a sequence of classification labels, (e.g. "walking" "running"), corresponding to segments determined in step 460. Step 470 is used for classifying the segmented video sequence based on the variable-segment scores such that each segment of the segments video has a classification. A method 600 of classifying temporal segments as executed at classification step 470 will be described in detail below with reference to FIG. 6.

The method 300 of determining scores for a variable length candidate segment using context features, as executed at step 435, will now be described with reference to FIG. 3. The method 300 will be described by way of example with reference to FIG. 9. The method 300 may be implemented as one or more software code modules of the software application program 233 resident on the hard disk drive 210 and being controlled in its execution by the processor 205.

Figure 3:
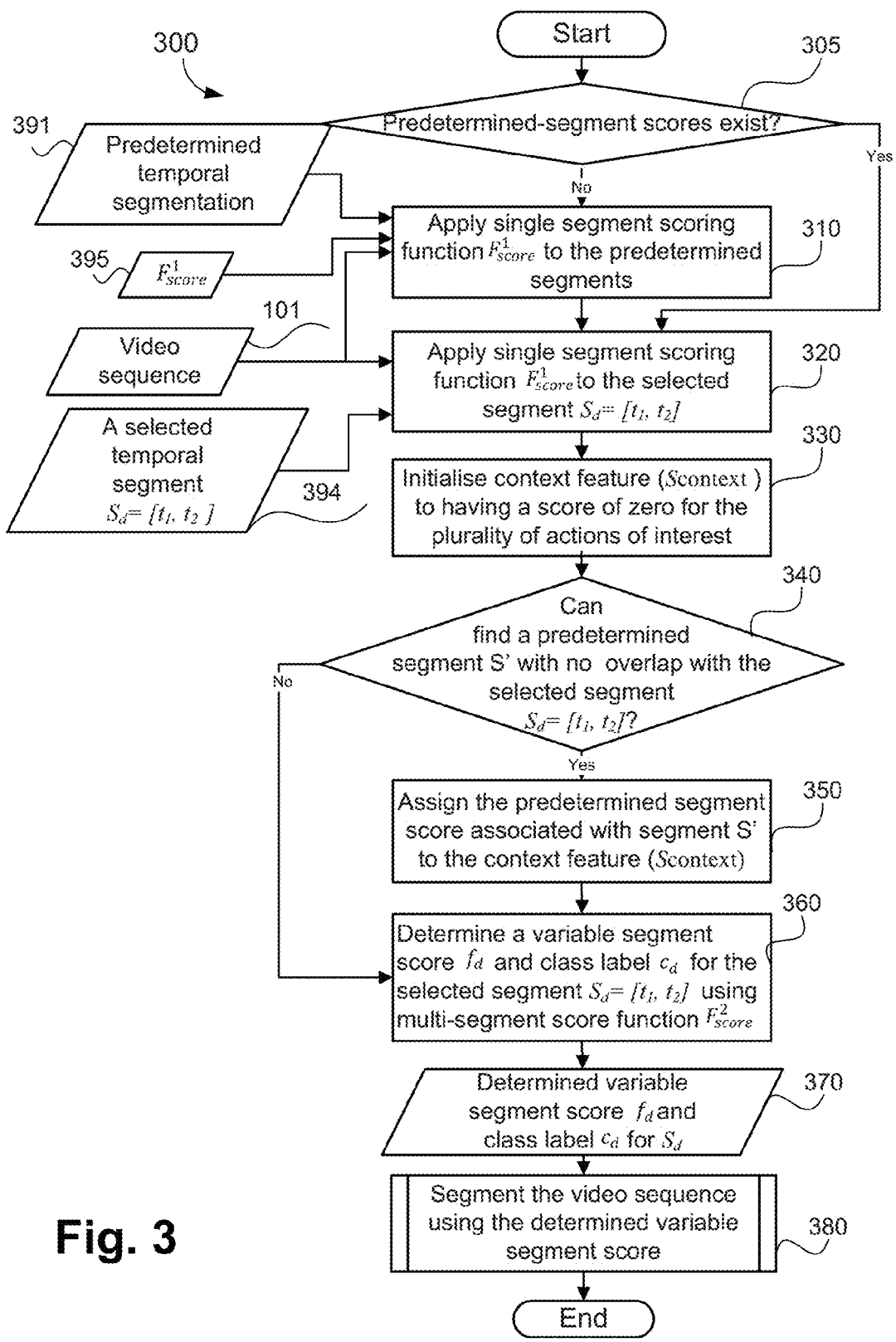
FIG. 3 is a schematic flow diagram showing a method of determining scores for a variable length candidate segment using context features.

The method 300 of FIG. 3 determines a score for a selected variable length segment 394 (as determined in step 430). The method 300 uses a predetermined-segment score vector as the context feature, when determining a variable-segment score ($f_d$) and classification label ($c_d$) for a given variable length selected temporal segment $S_d=[t_1, t_2]$, 394.

The method 300 starts at decision step 305, where if single-segment score vectors $\underline{v}_j^{l_i}$ 910 for a set of predetermined temporal segments 391 have been determined before, then the method 300 proceed to step 320. Otherwise, if the result of the test at step 305 is negative (i.e., those score vectors have not been determined before) then the method 300 follows to step 310.

At determining step 310, predetermined-segment score vectors are determined for the set of predetermined temporal segmentation 391, under execution of the processor 205 and are stored in the memory 206.

Then at determining step 320, the single-segment score vector for the selected segment 394 is determined under execution of the processor 205. FIG. 9 illustrates the process of determining predetermined-segment score vectors for the set of predetermined temporal segmentation 391, as is performed in step 310.

The predetermined temporal segmentation 391 corresponds to a multi-scaled fixed length segmentation of the video sequence. In one example, the predetermined temporal segmentation 391 includes multi-scale segmentation with fixed length segments of lengths seventy-five (75), one hundred and fifty (150), two-hundred and twenty five (225) and three hundred (300) frames.

Alternatively, the predetermined temporal segmentation 391 may be generated using an alternative temporal segmentation process (e.g., temporal segmentation using sliding windows).

Since the predetermined temporal segmentation 391 is independent of the selected variable length temporal segment 394, the predetermined-segment scores generated in step 310 can be cached within the memory 206 and reused for determining a variable-segment score for multiple selected variable length segment 394. At decision step 305, the first availability of such cached results is determined.

At step 310, predetermined-segment score vectors $\underline{v}_j^{l_i}$ are determined for the set of predetermined temporal segmentation 391 by applying a single-segment scoring function $F_{score}^1$ 395 to each of the plurality of segments in the predetermined temporal segmentation 391. The predetermined-segment score vectors $\underline{v}_j^{l_i}$ determined at step 310 may be stored in the memory 206 under execution of the processor 205. The single-segment scoring function $F_{score}^{1}$ corresponds to $\tilde{\mathcal{F}}$, as is used in Equation (10), and FIG. 9 and FIG. 10. The single-segment scoring function $F_{score}^{1}$ generates a score for each of a plurality of action classes of interest associated with a corresponding segment, using a suitable multi-class classifier, by applying the multi-class classifier to the segment. The multi-class classifier is pre-trained based on a training data-set containing instances of the actions of interest. Each training instance is a segment of the video sequence containing an action of interest. Each score in the single-segment score vector is a monotonic function of the likelihood of the segment being an instance of the action of interest.

The single-segment scoring function $F_{score}^{1}$ uses a multi-class classifier which is a multi-class support vector machine and the parameters of which are optimised using the optimisation problem of Equation (9). Alternatively, the multi-class classifier may be a probabilistic classifier, such as a multinomial logistic regression.

The classifier used in the single-segment scoring function $F_{score}^{1}$ uses an encoding of low-level action features such as space-time interest point (STIP) or improved dense trajectories (iDT) determined on all frames of the temporal segment. The feature encoding is performed using Fisher vector encoding technique. Alternatively, feature encoding techniques such as bag of words (BoW), or vector of locally aggregated descriptors (VLAD) feature encoding may be used in the single-segment scoring function $F_{score}^{1}$.

The method 300 continues at the determining step 320, where a single-segment score is determined for the selected variable segment 394 by applying the single-segment scoring function $F_{score}^{1}$ to a feature encoding (e.g., Fisher vector) of action features (e.g., STIP) of frames in the selected temporal segment $S_d$ (394). The single-segment score is determined at step 320 may be stored in the memory 206, under execution of the processor 205.

As described in the description of step 310, the output of $F_{score}^{1}$ is a vector containing a score for each action class of interest.

At context feature initialization step 330, a vector with the same length as the output of $F_{score}^{1}$ is assigned to $s_{context}$ and $s_{context}$ is initialized with a score of zero for the plurality of actions of interest.

Then at context forming step 340, a predetermined-segment S' which is disjoint or non-overlapping with the selected segment $S_d$ 394 is searched for, under execution of the processor 205. The predetermined-segment S' corresponds to a further one of the segments of the video sequence being processed in accordance with the method 400 and is used to provide information about actions that were classified outside the current selected segment $S_d$ 394.

At the context forming step 340, a predetermined-segment S' which ends before the start of the selected segment $S_d$ 394, is searched for under execution of the processor 205. Alternatively, a predetermined-segment S' which starts after the end of the selected segment $S_d$ 394 may be searched for at step 340.

If the search performed in step 340 determines a predetermined-segment S' with no overlap with the selected segment $S_d$ 394, then the method 300 proceeds to assigning step 350. Otherwise, the method 300 proceeds to step 360. At step 350, the predetermined-segment score of S' generated by applying the single-segment scoring function $F_{score}^{1}$ to the features calculated from frames of S' is assigned to the context feature $s_{context}$.

Next, the method 300 continues to context aware scoring step 360, where the context feature $s_{context}$, the single-segment score for the selected variable segment 394 as determined in step 320, and the multi-segment scoring function $F_{score}^{2}$ are used to determine a variable-segment score $f_d$ and classification label $c_d$ for the selected segment $S_d$. The variable-segment score $f_d$ represents a further segment score for the current selected segment $S_d$ and is determined according to the single-segment score. The variable-segment score $f_d$ and classification label $c_d$ for the selected segment $S_d$ determined at step 360 may be stored in the memory 206 under execution of the processor 205. The multi-segment scoring function $F_{score}^{2}$ corresponds to the scoring function $\mathcal{F}_{score}$, as is used in Equation (1) and FIG. 10. The multi-segment scoring function $F_{score}^{2}$ uses a multi-class classifier, which is a multi-class support vector machine trained using a method of directly learning a maximum-margin multi-class classification by generalizing the notion of margin from binary classification to multiclass prediction, as shown in Equation (12). An example of such a method is the multi-class support vector machine learning algorithm proposed by Crammer, K. and Singer, Y in the article entitled "On the algorithmic implementation of multiclass kernel-based vector machines". J. Mach. Learn. Res. 2, 265-292 (2001), which is hereby incorporated by reference in its entirety as if fully set forth herein.

The classification label $c_d$ is the label of the class with the highest score (which is commonly referred to as the winning class). Using such a classifier, the multi-segment scoring function $F_{score}^{2}$ returns the margin between the winner and the runner up classes as the output score $f_d$, and the temporal segmentation would be performed with the objective of maximising the classification margin in each segment.

Alternatively, the multi-segment scoring function $F_{score}^{2}$ may return the score corresponding to the winner class as the output score $f_d$, where the multi-class classifier used in multi-segment scoring function $F_{score}^{2}$ can be any multi-class classifier with probabilistic output. Examples of a multi-class classifier with probabilistic output, is a multinomial logistic regression, or a support vector machine with Platt scaling, where the temporal segmentation would be performed with the objective of maximising classification scores in each segment.

The classifier used in the multi-segment scoring function $F_{score}^{2}$ uses a concatenation of the context feature $s_{context}$ and the single-segment score for the selected variable length segment 394 as determined in step 320. While the two score vectors can be concatenated in any order, the same order should be used when learning the classifier and segmenting a sequence at recall time.

Given a set of video sequences and associated temporal parsing of the sequences into constituent actions of interest, a training instance for training the classifier used in the multi-segment scoring function $F_{score}^{2}$ can be generated by performing the following steps;

using the temporal parsing information, select a segment of video containing an action of interest as the selected temporal segment ($S_d$);

follow the processing steps 305 to 350 while the selected temporal segment $S_d$ is used as the selected temporal segment 394 to determine the context feature $S_{context}$;

determine the single-segment score of the selected temporal segment ($S_d$) using the processing step 320;

concatenate the determined context score $S_{context}$ and the single-segment score of the selected segment ($S_d$).

The concatenation of the scores together with the associated classification label of the selected temporal segment $S_d$ (also determined from the temporal parsing information) forms one training instance. A plurality of training instances generated as above are then used with a parameter learning technique, similar to Equation (12) to determine the parameters of the multi-class classifier used in the multi-segment scoring function $F_{score}^2$.

Using a trained classifier, the multi-segment scoring function $F_{score}^2$ can be used to determine a variable-segment score $f_d$ and classification label $c_d$ 360 for any selected temporal segment 394.

The method 300 concludes at segmentation step 380, where the input sequence 101 is segmented using the determined variable-segment scores of plurality of selected temporal segments 394, in accordance with the method 500.

A method 500 of determining a temporal segmentation of actions as executed at step 460, will be described in detail below with reference to FIG. 5. The method 500 determines the temporal segmentation, as shown in the backward pass algorithm of Equation (8).

The method 500 determines the optimal temporal segmentation of the sequence using the variable $\underline{l}$. The output of the method 500 is a set of frame numbers which are at the boundaries between temporal segments. The set of frame numbers determined in accordance with the method 500 may be stored in the memory 206 under execution of the processor 205.

The method 500 may be implemented as one or more software code modules of the software application program 233 resident in the hard disk drive and being controlled in its execution by the processor 205. The method 500 will be described by way of example with reference to FIG. 1.

The method 500 begins at setting step 510, where the value of an iterator i configured within the memory 206 is set to n, where n is the index of the last frame in the video sequence 101. Then at adding step 520, the current value of iterator u is added to the set of temporal segmentation frame numbers (SEG).

The method 500 then follows to decision step 530, where if the value of the iterator u is larger than zero, then the method 500 follows to updating step 540. Otherwise, the method 500 proceeds to outputting step 550.

At step 540, the iterator i is decremented by $\underline{l}[i]$, where $\underline{l}[i]$ is the $i^{th}$ element of the vector associated with the variable $\underline{l}$, in accordance with Equation (13), as follows:

$$i:=i-\underline{l}[i] \qquad (13)$$

The process then returns to step 520, where the newly determined value of iterator i is added to the set of temporal segmentation frame numbers (SEG) under execution of the processor 205.

At step 550, the set of temporal segmentation frame numbers SEG is output, as a negative output of the test in step 530 meaning all temporal segments are processed.

The method 600 of classifying temporal segments as executed at classification step 470 will be described in detail below with reference to FIG. 6. The method 600 determines a classification label associated with the temporal segments as determined by the temporal segmentation step 460, using the variables $\underline{l}$ and $\underline{c}$. The values of the variables $\underline{l}$ and $\underline{c}$ are updated in the processing step 445. The output of the classification step 470 is a set of classification labels 103 (see FIG. 1), representing the class of the action in each temporal segment.

The method 600 may be implemented as one or more software code modules of the software application program 233 resident in the hard disk drive and being controlled in its execution by the processor 205. The method 500 will be described by way of example with reference to FIG. 1.

The method 600 starts at setting step 610, where the value of iterator i configured within the memory 206 is set to n, where n is the index of the last frame in the video sequence 101. Then at adding step 620, $\underline{c}[i]$ (where $\underline{c}[i]$ is the $i^{th}$ element of the vector associated with the variable $\underline{c}$) is added to a set of sequence classification labels (SC) 103 configured within the memory 206. The method 600 then follows to decision step 630, where if the value of iterator index u is larger than zero, then the method 600 follows to updating step 640. Otherwise, the method 600 proceeds to outputting step 650.

At step 640, the value of the iterator i is decrements by $\underline{l}[i]$, where $\underline{l}[i]$ is the $i^{th}$ element of the vector associated with the variable $\underline{l}$, in accordance with Equation (14), as follows:

$$i:=i-\underline{l}[i] \qquad (14)$$

The method 600 then returns to step 620 where $\underline{c}[i]$ is added to the set of sequence classification labels (SC) 103 configured within the memory 206.

As described above, when the result of the test performed in step 630 is negative (i.e., the value of iterator index u is not larger than zero), the method 600 follows to step 650 where the set of classification labels (SC) are output.

Figure 7:
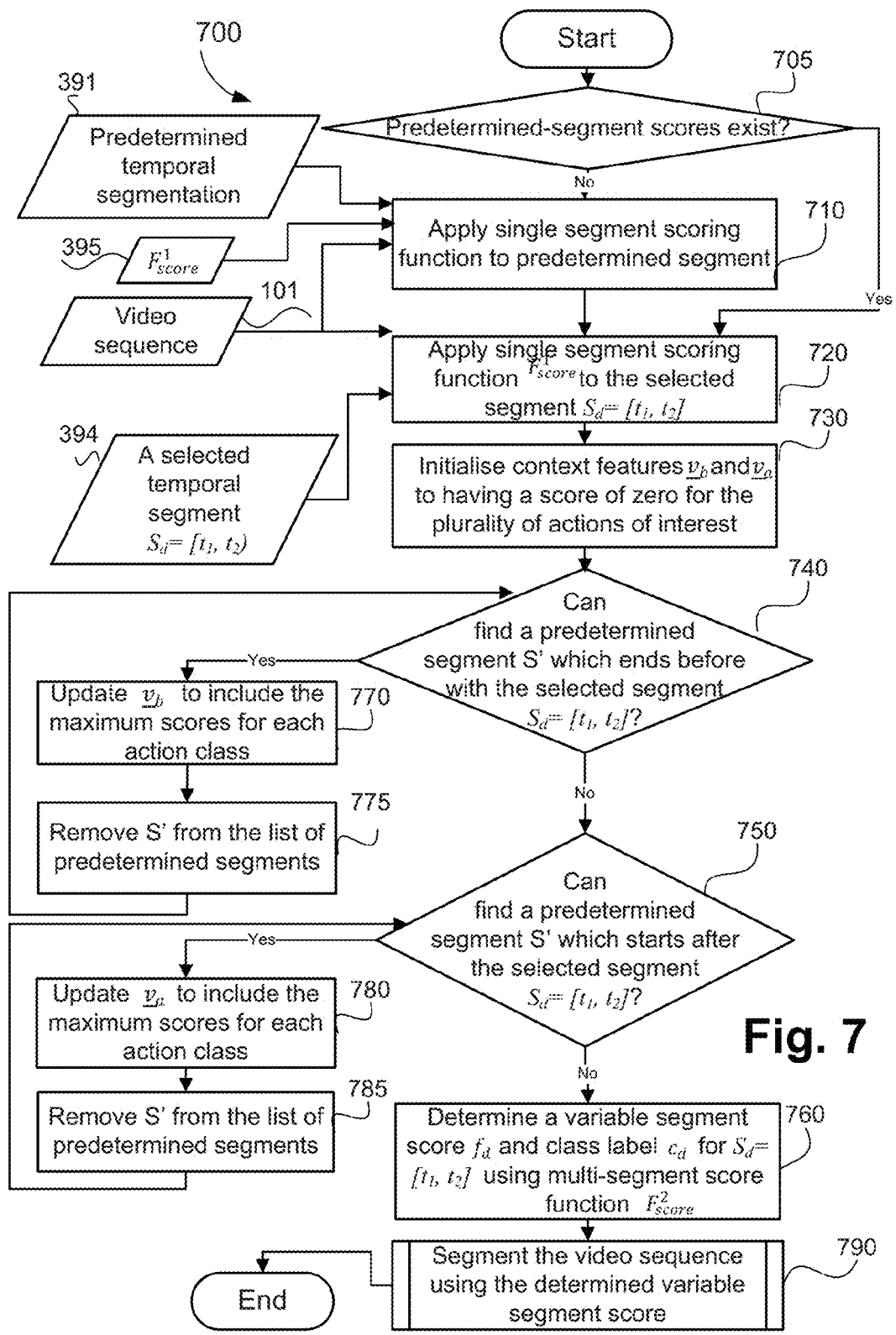
FIG. 7 is a schematic flow diagram showing another method of determining scores for a variable length candidate segment using context features.

A method 700 of determining scores for a variable length candidate segment using context features, which may alternatively be executed at step 435, will now be described with reference to FIG. 7. The method 700 will be described by way of example with reference to FIG. 9. The method 700 may be implemented as one or more software code modules of the software application program 233 resident on the hard disk drive 210 and being controlled in its execution by the processor 205. The method 700 may be alternatively be executed at step 435 to determine a variable-segment score for a selected temporal segment 394 as determined in step 430.

Similar to the method 300 of FIG. 3, the variable-segment score generation method 700 starts with decision step 705, where if single-segment score vectors $\underline{v}_j^{l_i}$ 910 for a set of predetermined temporal segments 391 have been determined before, then the method 700 proceed to step 720. Otherwise, if the result of the test at step 705 is negative (i.e., those score vectors have not been determined before) then the method 700 follows to step 710.

At applying step 710, predetermined-segment score vectors $\underline{v}_j^{l_i}$ 910 are determined for the set of predetermined temporal segmentation 391. The predetermined-segment score vectors $\underline{v}_j^{l_i}$ 910 determined at step 710 may be stored in the memory 206.

The process then follows to step 720, where a single-segment score vector is determined for the selected segment 394 under execution of the processor 205. The method 700 of FIG. 7 uses the same single-segment scoring function $F_{score}^1$ as the method 300. The single-segment score vector determined at step 720 may be stored in the memory 206, under execution of the processor 205. Next, at context feature initialization step 730 two context-feature variables $\underline{V}_b$ and $\underline{v}_a$ configured with memory 206 are initialized to vectors of zeros with the same length as the output of $F_{score}^1$ (i.e., the number of action classes of interest).

Next, at a backward search step 740 a predetermined-segment S', which is located before (i.e., ends before) the selected segment 394, is searched for under execution of the processor 205. When the search returns such a predetermined-segment S', the method 700 follows to a backward max-pooling step 770. At step 770, any element of $\underline{v}_b$ which is smaller than the corresponding element of the predetermined-segment score of the predetermined-segment S', is updated with the corresponding element of the predetermined-segment score of the predetermined-segment S'. Using the backward max-pooling step 770, each element of $\underline{v}_b$ corresponds to the maximum score for the corresponding action class from all the previously processed predetermined-segments S', as returned by the backward search step 740.

Then at removing step 775, the previously processed predetermined-segment S', as returned by the backward search step 740, is removed from the list of predetermined-segments which would be used next in the backward searching step 740. The process then returns to the backward search step 740.

When the search performed in the backward search step 740 cannot find any unprocessed predetermined-segment S' located before the selected segment 394, the method 700 follows to a forward search step 750. At step 750, a predetermined-segment S' which is located after (i.e, starts after) the selected segment 394 is search for under execution of the processor 205.

When the search performed in the forward search step 750 returns a predetermined-segment S' located after the selected segment 394, the method 700 follows to a forward max-pooling step 780. At step 780, any element of $\underline{v}_a$ which is smaller than the corresponding element of the predetermined-segment score of the predetermined-segment 5', is updated to the corresponding element of the predetermined-segment score of the predetermined-segment S'. Using the forward max-pooling step 780, each element of $\underline{v}_a$ corresponds to the maximum score for the corresponding action class from all the previously processed predetermined-segments S', as returned by the forward search step 750.

When the search performed in the forward search step 740 cannot find any unprocessed predetermined-segment 5', the method 700 follows to context aware scoring step 760, where the context feature $\underline{v}_a$ and $\underline{v}_b$, the single-segment score for the selected variable segment 394 as determined in step 320, and the multi-segment scoring function $F_{score}^2$ are used to determine a variable-segment score $f_d$ and classification label $c_d$ for the selected segment $S_d$. The variable-segment score $f_d$ and classification label $c_d$ for the selected segment $S_d$ determined at step 760 may be stored in the memory 206 under execution of the processor 205. Similar to the method 300 of FIG. 3, the multi-segment scoring function $F_{score}^2$ uses a multi-class classifier, which may be a multi-class support vector machine trained using the Crammer and Singer method mentioned above. The classification label $c_d$ is the label of the class with the highest score. Using such a classifier, the multi-segment scoring function $F_{score}^2$ returns the margin between the winner and the runner up classes as the output score $f_d$.

Alternatively, the multi-segment scoring function $F_{score}^2$ may return the score corresponding to the winner class as the output score $f_d$. Where the multi-segment scoring function $F_{score}^2$ returns the score corresponding to the winner class, the multi-class classifier used in multi-segment scoring function $F_{score}^2$ may be any multi-class classifier with probabilistic output and the temporal segmentation is performed to maximise classification scores in each segment.

In step 760, the classifier used in the multi-segment scoring function $F_{score}^2$ uses a concatenation of the context features $\underline{v}_b$ and $\underline{v}_a$, and the single-segment score for the selected variable length segment 394 as determined in step 720. While the three score vectors can be concatenated in any order, the same order should be used when learning the classifier and segmenting a sequence at recall time.

Training of the classifier used in the multi-segment scoring function $F_{score}^2$ according to the method 700 of FIG. 7, will now be described. Given a set of video sequences with associated temporal parsing of the sequences into constituent actions of interest, a training instance may be formed by selecting (using the associated temporal parsing information) a segment of video containing an action of interest as the selected temporal segment ($S_d$). The processing steps 705, 710, 720, 730, 740, 770, 775, 750, 780 and 785 may then be executed while the selected temporal segment $S_d$ is used as the selected temporal segment 394 to determine the context feature $\underline{v}_a$ and $\underline{v}_b$. The single-segment score of the selected temporal segment ($S_d$), as determined using the processing step [3]20, is also used to train the classifier. The concatenation of the scores together with the associated classification label of the selected temporal segment $S_d$ forms one training instance. A plurality of training instances generated as above may then be used with a parameter learning method such as sequential minimal optimisation to optimise the parameters of the multi-class classifier used in the multi-segment scoring function $F_{score}^2$.

Using a trained classifier, the multi-segment scoring function $F_{score}^2$ may be used to determine a variable-segment score $f_d$ and classification label $c_d$ 760 for any selected temporal segment 394.

The last step in the method 700 is segmentation step 790, where the input sequence 101 is segmented in accordance with the method 500 using the determined variable-segment scores of plurality of selected temporal segments 394.

In one example application of the above described methods, a collection of video clips of people preparing different foods may be temporally segmented into constituent action segments, and a set of temporal segmentation points and classification labels corresponding to the automatically generated temporal segments generated as output. In such an example application, there may be fifty (50) different classes of actions, where each video sequence may contain between five (5) to fifteen (15) different actions which need to be temporally segmented and recognised (i.e., classified). Using the described methods a significant improvement in temporal segmentation and classification accuracies was observed, compared to using existing methods that temporally segment video sequences of actions without using context features. In the example application of processing the video clips of the people preparing different foods, using the described methods, the temporal segmentation accuracy advantage is due to the use of hierarchical classification and the use of multi-segment scoring function $F_{score}^2$ which uses the context feature. The classification accuracy of the classifier used in the multi-segment scoring function $F_{score}^2$ is significantly better than the classification accuracy of the multi-class classifier used in the single-segment scoring function $F_{score}^1$. Thus, the variable-segment score $f_d$ generated using the multi-segment scoring function $F_{score}^2$ is a better guide signal for determining the temporal segmentation.

In the example application described above, using the described method also improves classification accuracy over existing methods that temporally segment the video sequence and classify each segment without using context features.

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of segmenting a video sequence, the method comprising:
   determining a segment score for each of a plurality of multi-scale fixed length segments of the video sequence, each of the segment scores providing a score for a plurality of actions associated with a corresponding multi-scale fixed length segment;
   selecting a current segment from said plurality of multi-scale fixed length segments of the video sequence;
   assigning the segment score of a further one of said segments as a context feature, the further segment being disjoint from the current segment and being used to provide context information outside the current segment;
   determining a variable segment score for the current segment according to the context feature associated with the further segment and the segment score of the current segment; and
   segmenting the video based on the determined variable segment score for the current segment.

2. The method according to claim 1, further comprising:
   classifying the segmented video based on the further segment score.

3. The method according to claim 2, wherein each segment of the segmented video has a classification.

4. The method according to claim 1 further comprising:
   selecting a further current segment from the video sequence;
   selecting the segment score for a still further one of said segments, the still further segment being disjoint with the further current segment; and
   determining a further segment score for the further current segment according to the selected segment score corresponding to the still further one of said segments.

5. The method according to claim 4, further comprising segmenting the video sequence by comparing the segment scores of the current segment and the further current segment.

6. The method according to claim 1, further comprising:
   determining the segment score for the current segment by applying a multi-class classifier to the current segment; and
   determining the further segment score for the current segment based on the segment score corresponding to the current segment.

7. The method according to claim 1, wherein the further fixed length segment includes a segment located before and a segment located after the current segment.

8. The method according to claim 1, further comprising:
   selecting a plurality of segments before the current segment;
   selecting features based on the segment scores of each of the plurality of segments, each of the selected features having a highest value for the feature from the plurality of segments.

9. The method according to claim 1, wherein the segment scores are determined using a multi-class classifier.

10. An apparatus for segmenting a video sequence, the apparatus comprising:
    means for determining a segment score for each of a plurality of multi-scale fixed length segments of the video sequence, each of the segment scores providing a score for a plurality of actions associated with a corresponding multi-scale fixed length segment;
    means for selecting a current segment from said plurality of multi-scale fixed length segments of the video sequence;
    means for assigning the segment score of a further one of said segments as a context feature, the further segment being disjoint from the current segment and being used to provide context information outside the current segment;
    means for determining a variable segment score for the current segment according to the context feature associated with the further segment and the segment score of the current segment; and
    means for segmenting the video based on the determined variable segment score for the current segment.

11. A system for segmenting a video sequence, the comprising:
    a memory comprising data and a computer program;
    a processor coupled to the memory for executing the computer program, the computer program comprising instructions for:
       determining a segment score for each of a plurality of multi-scale fixed length segments of the video sequence, each of the segment scores providing a score for a plurality of actions associated with a corresponding multi-scale fixed length segment;
       selecting a current segment from said plurality of multi-scale fixed length segments of the video sequence;
       assigning the segment score of a further one of said segments as a context feature, the further segment being disjoint from the current segment and being used to provide context information outside the current segment;
       determining a variable segment score for the current segment according to the context feature associated with the further segment and the segment score of the current segment; and
       segmenting the video based on the determined further variable segment score for the current segment.

12. A non-transitory computer readable storage medium having a computer program stored on the storage medium for segmenting a video sequence, the program comprising:
    code for determining a segment score for each of a plurality of multi-scale fixed length segments of the video sequence, each of the segment scores providing a score for a plurality of actions associated with a corresponding multi-scale fixed length segment;
    code for selecting a current segment from said plurality of multi-scale fixed length segments of the video sequence;
    code for assigning the segment score of a further one of said segments as a context feature, the further segment being disjoint from the current segment and being used to provide context information outside the current segment;
    code for determining a variable segment score for the current segment according to the context feature associated with the further segment and the segment score of the current segment; and code for segmenting the video based on the determined variable segment score for the current segment.

13. The method according to claim 1, wherein a length of each of the plurality of multi-scale fixed length segments is based on a parsing constraint.

14. The method according to claim 1, wherein a number of segmentation scales for the multi-scale fixed length segments are predefined.

15. The method according to claim 1, wherein the context feature associated with the further segment is a concatenation of segment scores of the further segment for all scales of the further segment.

* * * * *